(12) United States Patent
Hu et al.

(10) Patent No.: US 9,733,959 B2
(45) Date of Patent: Aug. 15, 2017

(54) POLICY-BASED HYPERVISOR CONFIGURATION MANAGEMENT

(75) Inventors: Jeffrey Hu, Palo Alto, CA (US); Kiran Kamath, Mountain View, CA (US); Saurav Sen, Sunnyvale, CA (US); Sandhya Kunnatur, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1871 days.

(21) Appl. No.: 12/210,928

(22) Filed: Sep. 15, 2008

(65) Prior Publication Data
US 2010/0070970 A1   Mar. 18, 2010

(51) Int. Cl.
*G06F 9/455*   (2006.01)

(52) U.S. Cl.
CPC .............................. *G06F 9/45533* (2013.01)

(58) Field of Classification Search
CPC .................................................... G06F 9/45533
USPC .......................... 718/1, 104, 105; 713/1, 100
See application file for complete search history.

(56) References Cited

U.S. PATENT DOCUMENTS

| | | | |
|---|---|---|---|
| 7,577,722 B1* | 8/2009 | Khandekar et al. | 709/220 |
| 7,831,820 B2* | 11/2010 | Winner et al. | 713/1 |
| 2002/0069369 A1* | 6/2002 | Tremain | 713/201 |
| 2006/0143617 A1* | 6/2006 | Knauerhase | G06F 9/50 718/104 |
| 2009/0265707 A1* | 10/2009 | Goodman et al. | 718/1 |

* cited by examiner

*Primary Examiner* — David J Huisman

(57) ABSTRACT

At least one target configuration of a host at a virtualization software level is automatically assembled based on a source configuration. A policy-based profile describing the source configuration is processed. A configuration specification describing the target configuration is automatically created, based on the policy-based profile describing the source configuration. The configuration specification is automatically applied to target configurations, such that the target configurations are compliant with the policy-based profile.

24 Claims, 3 Drawing Sheets

POLICY-BASED HYPERVISOR CONFIGURATION MANAGEMENT

TECHNICAL FIELD

One or more embodiments of this invention pertain generally to virtual computing, and more specifically to policy-based managing of hypervisor configuration.

BACKGROUND

Virtualization technologies are becoming prevalent in the market place. At least some of these technologies provide a virtual hardware abstraction to guest operating systems, and allow them to run in virtual machines in a functionally isolated environment on a host computer without being modified. Virtualization allows one or more virtual (guest) machines to run on a single physical (host) computer, providing functional and performance isolation for processor, memory, storage, etc.

As is well known in the field of computer science, a virtual machine is an abstraction—a "virtualization"—of an actual physical computer system. FIG. 1 shows one possible arrangement of a computer system (computer system 700) that implements virtualization. As shown in FIG. 1, virtual machine or "guest" 200 is installed on a "host platform," or simply "host," which includes system hardware, that is, hardware platform 100, and one or more layers or co-resident components comprising system-level software, such as an operating system or similar kernel, or a virtual machine monitor or hypervisor 201 (see below), or some combination of these. The system hardware typically includes one or more processors 110, memory 130, some form of mass storage 140, and various other devices 170.

Each virtual machine 200 will typically have both virtual system hardware 211 and guest system software 202. The virtual system hardware 211 typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the virtual machine may be implemented in software using known techniques to emulate the corresponding physical components. The guest system software includes guest operating system (OS) 220 and drivers 224 as needed for the various virtual devices 270.

Note that a single virtual machine 200 may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP virtual machines. FIG. 1, for example, illustrates multiple virtual processors 210-0, 210-1, . . . , 210-*m* (VCPU0, VCPU1, . . . , VCPUm) within virtual machine 200.

Yet another configuration is found in a so-called "multi-core" host architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another configuration that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. One or more embodiments of this invention may be used regardless of the type—physical and/or logical—or number of processors included in a virtual machine.

In many cases applications 260 running on virtual machine 200 will function as they would if run on a "real" computer, even though the applications are running at least partially indirectly, that is via guest O/S 220 and virtual processor(s). Executable files will be accessed by the guest O/S from virtual disk 240 or virtual memory 230, which will be portions of the actual physical disk 140 or memory 130 allocated to that virtual machine. Once an application is installed within the virtual machine, the guest O/S retrieves files from the virtual disk just as if the files had been stored as the result of a conventional installation of the application. The design and operation of virtual machines are well known in the field of computer science.

Some interface is generally required between the guest software within a virtual machine and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors" 201, or "virtualization kernels." Because virtualization terminology has evolved over time and has not yet become fully standardized, these terms do not always provide clear distinctions between the software layers and components to which they refer. For example, the term "hypervisors" 201 is often used to describe both a VMM and a kernel together, either as separate but cooperating components or with one or more VMMs incorporated wholly or partially into the kernel itself; however, the term "hypervisors" 201 is sometimes used instead to mean some variant of a VMM alone, which interfaces with some other software layer(s) or component(s) to support the virtualization. Moreover, in some systems, some virtualization code is included in at least one "superior" virtual machine to facilitate the operations of other virtual machines. Furthermore, specific software support for virtual machines may be included in the host OS itself. Unless otherwise indicated, one or more embodiments of the invention described herein may be used in virtualized computer systems having any type or configuration of virtualization software.

FIG. 1 shows virtual machine monitors that appear as separate entities from other components of the virtualization software. Furthermore, some software components used to implement one or more embodiments of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that one or more embodiments of the invention can be implemented anywhere within the overall structure of the virtualization software, and even in systems that provide specific hardware support for virtualization.

The various virtualized hardware components in the virtual machine, such as virtual CPU(s) 210-0, 210-1, . . . , 210-*m*, virtual memory 230, virtual disk 240, and virtual device(s) 270, are shown as being part of virtual machine 200 for the sake of conceptual simplicity. In actuality, these "components" are usually implemented as software emulations 235 included in the VMM.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest O/S could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, the term para-virtualization implies that the guest O/S (in particular, its kernel) is specifically designed to support such an interface. According to this view, having, for example, an off-the-shelf version of Microsoft Windows XP™ as the guest O/S would not be consistent with the notion of para-virtualization. Others define the term para-virtualization more broadly to include any guest O/S with any code that is specifically intended to provide information directly to any other component of the virtualization software. According to this view, loading a module such as a driver designed to communicate with other virtualization components renders the system para-virtualized, even if the guest O/S as such is an off-the-shelf, commercially available OS not specifically designed to support a virtualized computer system. Unless otherwise indicated or apparent, embodiments of this invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM.

As illustrated in FIG. 1, in many cases, it may be beneficial to deploy VMMs on top of a software layer—kernel 600—constructed specifically to provide support for the virtual machines. This configuration is frequently referred to as being "non-hosted." Kernel 600 also handles any other applications running on it that can be separately scheduled, as well as a console operating system that, in some architectures, is used to boot the system and facilitate certain user interactions with the virtualization software.

Note that kernel 600 is not the same as the kernel that will be within guest O/S 220—as is well known, every operating system has its own kernel. Note also that kernel 600 is part of the "host" platform of the virtual machine/VMM as defined above even though the configuration shown in FIG. 1 is commonly termed "non-hosted;" moreover, the kernel may be both part of the host and part of the virtualization software or "hypervisor" 201. The difference in terminology is one of perspective and definitions that are still evolving in the art of virtualization.

As will be understood by those of ordinary skill in the relevant art, computer virtualization enables host hardware 100 to be used as a pool of interchangeable, commodity resources for running virtual machines 200. The interchangeability of resources enables information services to be flexibly managed allowing for superior performance, availability, and scalability over a non-virtualized environment. As requirements for additional information services scale, virtualization meets this need by enabling commodity resources to be added and removed on a scale that is commensurate with current resource usage.

As resources are added to a deployment there is usually a corresponding manageability cost. A virtualized environment helps to contain the growth in manageability cost by decoupling the customizations specific to an information service from the host configuration. For example, the amount of required CPU 110 and memory resources 130 is a specification of the virtual machine 200 rather than the host. As a result, the range of configuration variation between hosts in a virtualized environment is smaller than that in a non-virtualized environment. Scaling hardware resources 100 to meet resource requirements is more tractable in a virtualized environment since the growth in manageability cost is contained.

Under powerful virtualization software interfaces between virtual machines 200 and the various hardware components and devices in the underlying host platform, a rich set of configuration controls exist providing mechanisms enabling administrators to reach robust levels of performance, availability, scalability, and manageability. As noted above, such host level "virtualization software" can be known in the field of virtual machine technology as a "hypervisors" 201, "virtual machine monitor," "virtualization kernel" or other labels. For ease of discussion, such components will be herein referred to as hypervisors 201, although the naming is not important.

In any case, the costs associated with these mechanisms entail additional controls that enable an administrator to select an appropriate balance between benefit and cost. Hence, some of the reduction in configuration complexity gained by virtualization is returned in exchange for needing to configure the hypervisor 201 to improve the runtime characteristics of the virtualized information services. In other words, a significant overhead can be involved in the configuration of feature-rich hypervisors 201.

It would be desirable to ensure the benefits of scaling hardware resources 100 are not lost to growing manageability costs when operating with a powerful hypervisor 201, particularly within the context of the growth in configuration complexity as more hypervisor 201 instances are added to a deployment.

SUMMARY OF INVENTION

In one embodiment, at least one target configuration of a host at a virtualization software level is automatically assembled based on a source configuration. In order to create a target configuration, a policy-based profile describing the source configuration is processed. More specifically, a configuration specification describing the target configuration is automatically created, based on the policy-based profile describing the source configuration. The configuration specification is automatically applied to target configurations, such that the target configuration(s) are compliant with the policy-based profile.

In another embodiment, a computer implemented method for automatically assembling at least one target configuration of a host at a virtualization software level based on a source configuration of a host at a virtualization software level is disclosed. The method included processing a policy-based profile describing the source configuration. A configuration specification for the at least one target configuration is automatically created based on the policy-based profile describing the source configuration. Then, the configuration specification is automatically applied to the at least one target configuration, such that the at least one target configuration is based on the policy-based profile.

In yet another embodiment, a computer system for automatically assembling at least one target configuration of a host at a virtualization software level based on a source configuration of a host at a virtualization software level is disclosed. The computer system includes means for processing a policy-based profile describing the source configuration, means for automatically creating a configuration specification for the at least one target configuration based on the Policy-based profile describing the source configuration, and means for automatically applying the configuration specification to the at least one target configuration, such that the at least one target configuration is based on the policy-based profile.

DETAILED DESCRIPTION

Figure 1:
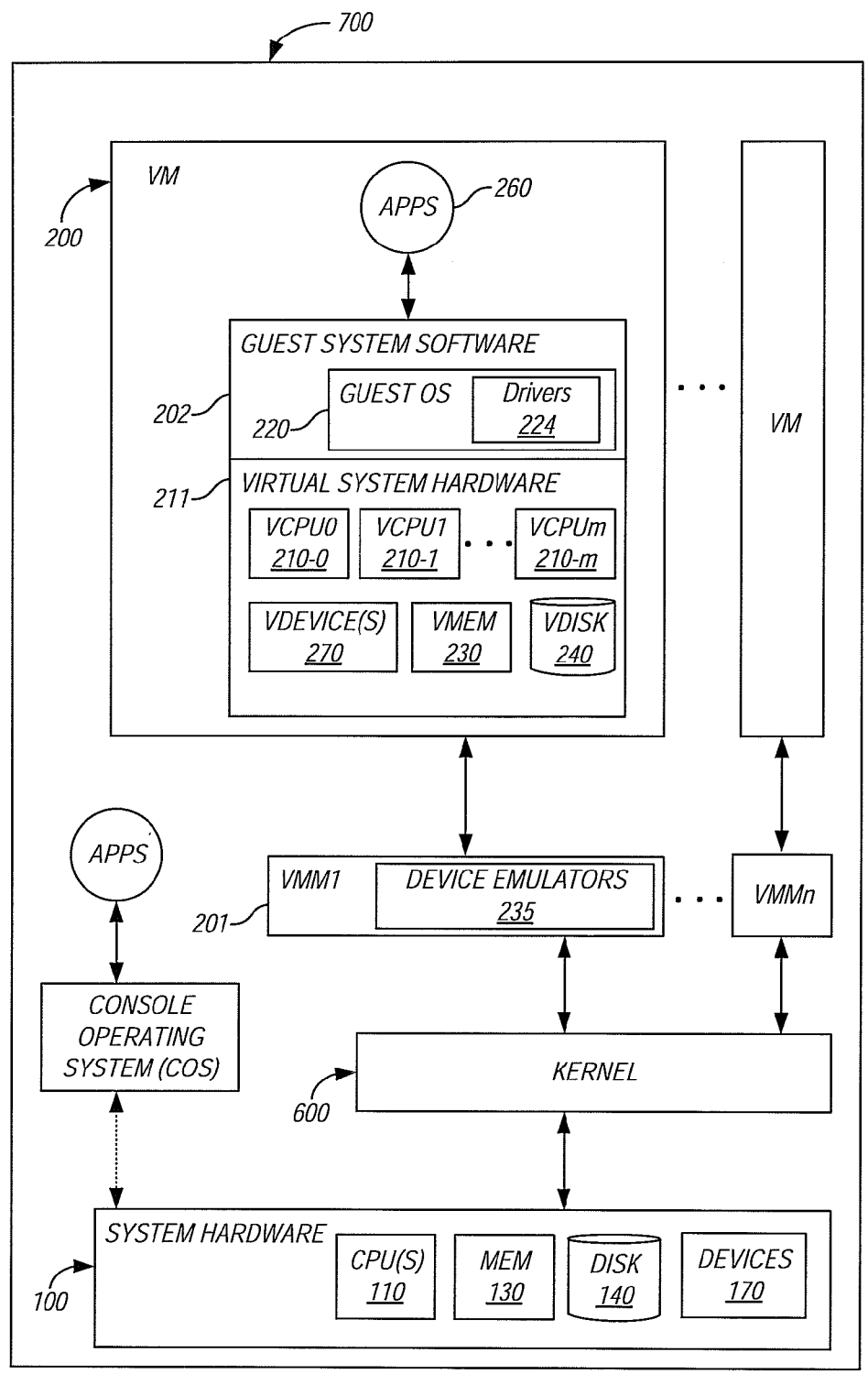
FIG. 1 is a block diagram illustrating an example of prior art virtualization technology.
Figure 2:
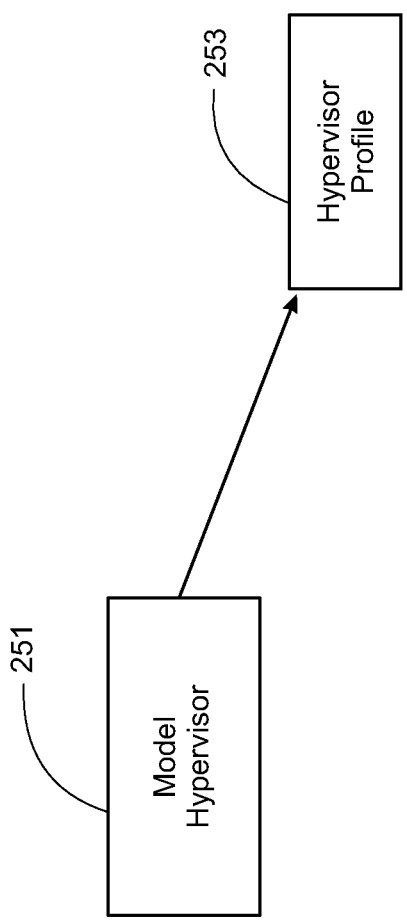
FIG. 2 is a block diagram illustrating a system for using a source hypervisor to create a hypervisor profile, according to some embodiments of the present invention.

FIG. 2 illustrates a system in which a given "model" hypervisor 251 is used to create a hypervisor profile 253 which can be used to configure additional hypervisors 201, according to some embodiments of the present invention. It is to be understood that although various components are illustrated as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

In order to configure a host at a virtualization software level, a large number of configuration options (e.g., 35-40) are typically specified. For example, a hypervisor 201 configuration could include directives governing processor management, threading, network configuration (switches, ports, NICS, etc.), routing, security, virtual software licensing, storage allocation, memory partitioning, firewall management, etc. In an embodiment illustrated in FIG. 2, to enable template-like representation of a hypervisor 201, a description of the model hypervisor 251 is created that represents the complete configuration of a host at a virtualization software level. This description can be used as the basis from which to configure other hypervisors 201.

More specifically, a hypervisor profile 253 is generated from an existing hypervisor 201 configuration by mapping each individual configuration setting to a hypervisor profile configuration policy. A set of applicable and valid policies for a hypervisor profile 253 indicate what options and parameters are to be specified, and what values are valid. In other words, the specific contents of a hypervisor profile 253 is automatically kept within the boundaries specified by the set of applicable and valid policies. A hypervisor profile 253 can be thought of as a collection of policies. A policy-driven approach allows flexibility and extensibility in how hypervisor 201 configurations can be managed. A variety of configuration policies can be used to define a hypervisor profile 253.

For example, deferred configuration policies allow the setting of values to be deferred until the time an actual hypervisor 201 is configured based on the profile 253. For example, a profile 253 could specify to use two NICS, or two NICS that fall within a given bandwidth criteria. The specific two NICS to use would then be determined at actual configuration time, based on user input and/or automatically gleaned data. This type of policy is useful for handling parameters that are specific to a given host, such as machine identifiers. As there can be both software and hardware variations on the target hosts, policies can also be conditional, e.g., use three NICS if three are available, otherwise use two.

Composite policies can be constructed as a combination of one or more existing policies. Composite policies make it easier to mix and match similar policies to build new ones. Requirement based policies can be used to communicate service level configuration requirements, rather than specific configuration settings. Allocated resources policies can specify the use of a resource allocator for configuration. Examples include an IP address pool from which addresses are allocated on a per request basis.

In some embodiments, the model hypervisor 251 is analyzed and a resulting profile 253 is created automatically, e.g., by a software component. In other embodiments, some or all of this process is performed by a user. In either case, users can typically edit a created profile 253, for example to eliminate errors or fine tune parameters. Once a profile 253 is created, it can be used to configure one or more hypervisors 201 in many execution environments, as described in more detail below.

Figure 3:
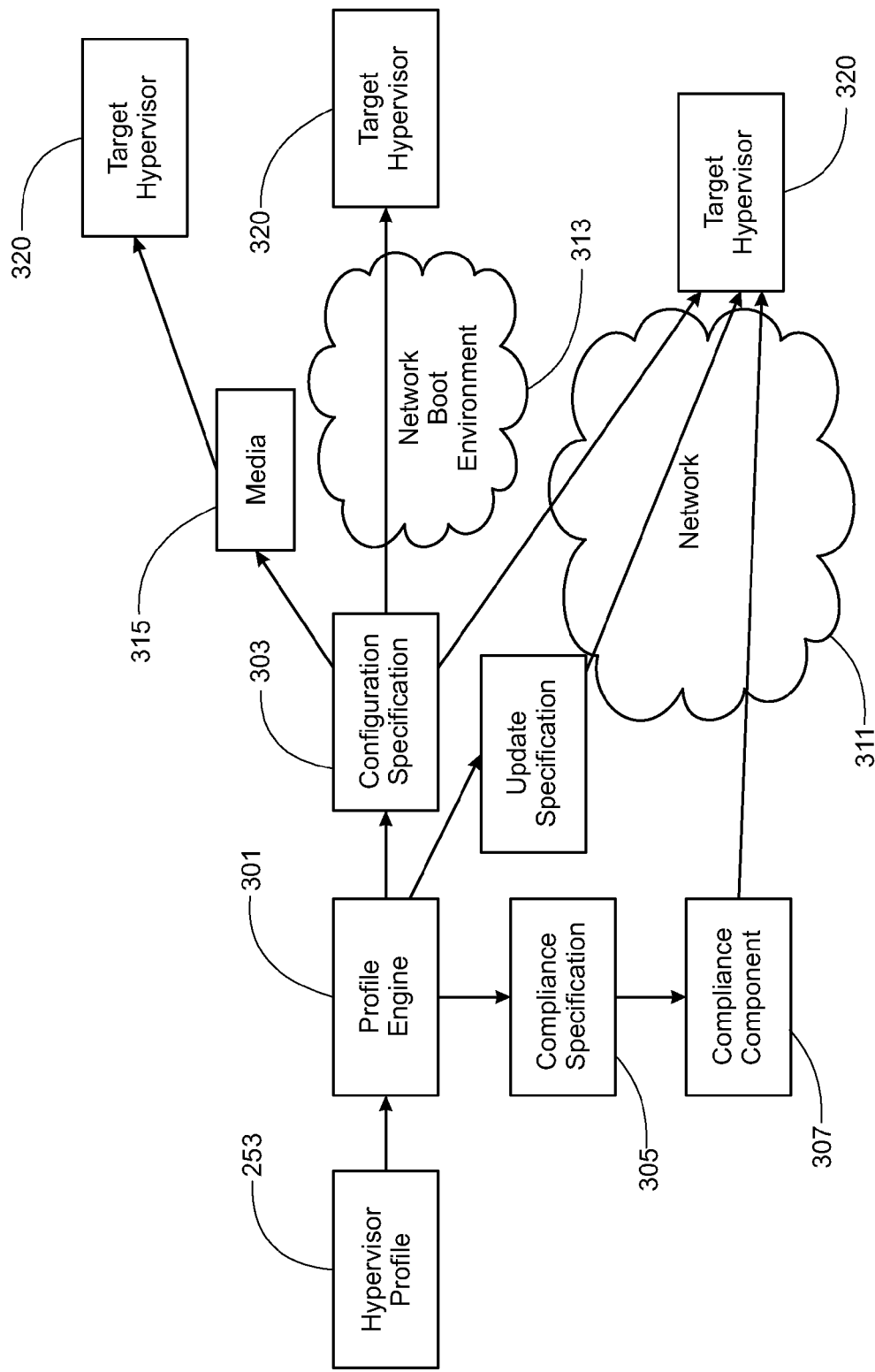
FIG. 3 is a block diagram illustrating a system for using a hypervisor profile to configure target hypervisors, according to other embodiments of the present invention.

Turning now to FIG. 3, a hypervisor profile engine 301 can apply a hypervisor profile 253 to one or more additional hypervisor(s) 201 by rendering the profile 253 to produce a configuration specification 303 describing a target hypervisor 320 configuration. More specifically, as explained above, a hypervisor profile 253 is data representing a set of policies. The profile 253 is read by the hypervisor profile engine 301, which uses these input policies (and the current host configuration specification) to determine how an output configuration specification 303 should be defined. The configuration specification, which is output by the hypervisor profile engine 301, is in the form of a script, executable image, data, etc., to automatically configure host level virtualization software (i.e., a hypervisor 201). In other words, the hypervisor profile engine 301 performs the computation to render the hypervisor profile 253 into a hypervisor-specific configuration specification 303 that can be used to configure actual hypervisors 320. The configuration specification 303 can be applied to actual configurations in a deployment.

Because hypervisor profiles 253 tend to be centrally managed, and the target hypervisors 320 themselves are inherently decentralized, some form of communication is typically utilized to provide the configuration instructions from the hypervisor profile engine 301 to the actual hypervisors 320 being configured. A variety of options are possible. In an in-band network scenario, the hypervisor profile engine 301 runs from a machine on the same communication network 311 as a hypervisor 320 being configured. The hypervisor profile engine 301 communicates with the hypervisor 320 over the network 311 to manage its configuration. In a bootstrap network configuration, a copy of the hypervisor profile engine 301 along with the applicable hypervisor profile 203 is deployed to the hypervisor 320 being configured at boot time, as part of the boot process through a network based bootstrap environment 313, such as preboot execution environment (PXE). In another scenario, virtual or physical media 315 is utilized. In that case, a copy of the hypervisor profile engine 301 along with the applicable hypervisor profile 253 is deployed to the hypervisor 320 being configured through media 315 delivered directly to the target hypervisor 320.

Once a set of target hypervisors 320 in a deployment is configured, it is desirable to ensure that the hypervisors 320 remain configured as per the profile 253. To this end, a compliance specification 305 can also be derived from the hypervisor profile 253. A compliance specification 305 is in effect a set of compliance checks generated by the engine 301 from the description of the configuration in the profile 253. In other words, the compliance specification 305 describes what checks are to be performed to verify that a hypervisor 320 is properly configured. From time to time (e.g., as specified by a user, or at a default interval), a compliance component 307 uses the compliance specification 305 to verify that the hypervisors 320 generated based on the profile 253 are still in compliance therewith. Responsive to determining that a given hypervisor 320 is not in compliance, the compliance component 307 can take an appropriate action as desired (e.g., generate an alert or report for a user, update the configuration, etc.). The compliance component 307 is able to identify and describe the differences between the existing configuration and the target configuration (the delta), e.g., for reporting or updating purposes.

Updates can be made to either a model hypervisor 251 configuration itself, or to a hypervisor profile 253. For example, the model hypervisor 251 can be updated (or replaced), and used to generate an updated profile 253. The updated profile 253 can then be run through the engine 301 to create an update specification 309 for roll-out in the deployment. In some embodiments, the update specification 309 simply describes the differences between the existing and updated configurations, which makes roll-out of the update a simpler process. An existing profile 253 can also be edited directly, or replaced with a new profile 253, for example one imported from an external source.

As described above, using a hypervisor profile 253, it is possible to provide a complete configuration management solution for setting up and maintaining a hypervisor 201 configuration for use in a scale-out virtualization deployment. Policies can describe specific configuration settings rather than how a configuration state should be managed (backup, snapshot, etc.). Differences between profiles 253 can be described in terms of configuration differences rather than file or block differences. When a profile 253 is applied, differences between a target configuration and the created configuration can be described in terms of a configuration delta. Likewise, when a profile 253 is checked for compliance, differences between the target configuration and actual configuration are identified and described. Constraint based creation and editing of a profile 253 provides users with maximal flexibility in profile 253 authoring. A profile 253 configures a resulting hypervisor 201 in accordance with a variety of configuration specific policies (i.e., deferred, composite, requirement, allocated, etc.). The profile 253 can be used to verify that the hypervisor 201 is properly configured according to the configuration policies. A profile 253 can be updated from a source hypervisor 201 on a continuing basis, and profile 253 updates can be applied to corresponding hypervisor 201 configurations with minimal service disruption.

It is to be understood that the above description uses the term "hypervisor" 201 throughout, but as noted above, the term hypervisor 201 can be used quasi-interchangeably with other terms such as VMM, and the use of any such host level software virtualization component is within the scope of the present invention. Furthermore, various embodiments of the present invention can be implemented under the various virtualization scenarios discussed in the background section above.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A computer-implemented method for automatically assembling at least one target configuration of a target host at a virtualization software level based on a source configuration of a first host at the virtualization software level, the method comprising the steps of:
   accessing the source configuration for the first host at the virtualization software level, wherein the first host is configured to instantiate at least one virtual machine;
   processing a policy-based profile describing the source configuration, the source configuration comprising a plurality of individual configuration settings representing a complete configuration of the source configuration of the first host at the virtualization software level from which to configure the at least one target configuration at deployment;
   automatically creating a configuration specification for the at least one target configuration based on the policy-based profile describing the source configuration by mapping each of the individual configuration settings of the plurality of individual configuration settings to the configuration specification for the at least one target configuration of the target host at the virtualization software level;
   automatically applying the configuration specification to the at least one target configuration, such that the at least one target configuration is based on the policy-based profile and such that the at least one target configuration represents the complete configuration of the source configuration;
   automatically creating a compliance specification for the at least one target configuration based on the policy-based profile describing the source configuration, the compliance specification comprising at least one check to verify that a target configuration is in compliance with the policy-based profile;
   utilizing the compliance specification to determine whether the at least one target configuration is in compliance with the policy-based profile; and
   responsive to updating the policy-based profile, automatically updating the at least one target configuration to place the at least one target configuration in compliance with the updated policy-based profile.

2. The method of claim 1 wherein automatically applying the configuration specification to the at least one target configuration further comprises performing at least one step from a group of steps consisting of:
   configuring at least one target across a network;
   configuring at least one target as part of a boot process, in a network-based boot environment;
   utilizing at least one physical computer readable medium as a delivery device to configure at least one target; and
   utilizing at least one virtual computer readable medium as a delivery device to configure at least one target.

3. The method of claim 1 further comprising, responsive to determining that the at least one target configuration is not in compliance with the updated policy-based profile, alerting a user that the at least one target configuration is not in compliance with the updated policy-based profile.

4. The method of claim 1 wherein the automatically updating the at least one target configuration to place the at least one target configuration in compliance with the updated policy-based profile comprises:
   automatically creating an updated configuration specification for the at least one target configuration based on the updated policy-based profile describing the source configuration; and
   automatically applying the updated configuration specification to the at least one target configuration, such that the at least one target configuration is based on the updated policy-based profile.

5. The method of claim 4 wherein automatically creating an updated configuration specification for the at least one target configuration based on the updated policy-based profile describing the source configuration further comprises:
   automatically creating an updated configuration specification describing a delta between an existing target configuration and an updated target configuration, and at least one operation to alter the at least one target configuration to eliminate the delta.

6. The method of claim 4 further comprising:
   determining that at least one modification has been made to the source configuration; and responsive to the at least one modification, creating the updated policy-based profile describing the source configuration.

7. The method of claim 1 further comprising:
automatically ensuring that specific contents of a configuration profile is kept within boundaries specified by a set of applicable and valid policies.

8. The method of claim 1 wherein creating a policy-based profile describing the source configuration comprises specifying at least one policy type from a group of policy types consisting of:
deferred policies;
conditional policies;
composite policies;
requirement based policies; and
allocated resource policies.

9. The method of claim 1 wherein automatically applying the configuration specification to the at least one target configuration comprises:
configuring at least one target as part of a boot process, in a network-based boot environment.

10. The method of claim 1 wherein automatically applying the configuration specification to the at least one target configuration comprises:
utilizing at least one physical computer readable medium as a delivery device to configure at least one target.

11. The method of claim 1 wherein automatically applying the configuration specification to the at least one target configuration comprises:
utilizing at least one virtual computer readable medium as a delivery device to configure at least one target.

12. The method of claim 1 further comprising:
deploying the at least one target configuration to a target.

13. The method of claim 1 further comprising, responsive to determining that the at least one target configuration is not in compliance with the updated policy-based profile, determining a delta between a target configuration not in compliance and a compliant target configuration.

14. The method of claim 1 further comprising, responsive to determining that the at least one target configuration is not in compliance with the updated policy-based profile, generating a report concerning the at least one target configuration that is not in compliance with the updated policy-based profile.

15. The method of claim 1 further comprising, responsive to determining that the at least one target configuration is not in compliance with the updated policy-based profile, automatically updating the at least one target configuration such that the at least one target configuration is in compliance with the updated policy-based profile.

16. At least one non-transitory computer readable medium containing a computer program product for automatically assembling at least one target configuration of a target host at a virtualization software level based on a source configuration of a first host at the virtualization software level, the computer program product comprising:
program code for accessing the source configuration for the first host at the virtualization software level, wherein the first host is configured to instantiate at least one virtual machine;
program code for processing a policy-based profile describing the source configuration, the source configuration comprising a plurality of individual configuration settings representing a complete configuration of the source configuration of the first host at the virtualization software level from which to configure the at least one target configuration at deployment;

program code for automatically creating a configuration specification for the at least one target configuration based on the policy-based profile describing the source configuration by mapping each of the individual configuration settings of the plurality of individual configuration settings to the configuration specification for the at least one target configuration of the target host at the virtualization software level;
program code for automatically applying the configuration specification to the at least one target configuration, such that the at least one target configuration is based on the policy-based profile and such that the at least one target configuration represents the complete configuration of the source configuration;
program code for automatically creating a compliance specification for the at least one target configuration based on the policy-based profile describing the source configuration, the compliance specification comprising at least one check to verify that a target configuration is in compliance with the policy-based profile;
program code for utilizing the compliance specification to determine whether the at least one target configuration is in compliance with the policy-based profile; and
program code for automatically updating the at least one target configuration, in response to updating the policy-based profile, to place the at least one target configuration in compliance with the updated policy-based profile.

17. The at least one non-transitory computer readable medium of claim 16 wherein the program code for automatically applying the configuration specification to the at least one target configuration further comprises program code for performing at least one step from a group of steps consisting of:
configuring at least one target across a network;
configuring at least one target as part of a boot process, in a network-based boot environment;
utilizing at least one physical computer readable medium as a delivery device to configure at least one target; and
utilizing at least one virtual computer readable medium as a delivery device to configure at least one target.

18. The at least one non-transitory computer readable medium of claim 16 further comprising, program code for, responsive to determining that the at least one target configuration is not in compliance with the updated policy-based profile, performing at least one step from a group of steps consisting of:
determining a delta between the at least one target configuration not in compliance and a compliant target configuration;
alerting a user that the at least one target configuration is not in compliance with the updated policy-based profile; and
generating a report concerning the at least one target configuration that is not in compliance with the updated policy-based profile.

19. The at least one non-transitory computer readable medium of claim 16 further comprising:
program code for automatically creating an updated configuration specification for the at least one target configuration based on the updated policy-based profile describing the source configuration; and
program code for automatically applying the updated configuration specification to the at least one target configuration, such that the at least one target configuration is based on the updated policy-based profile.

20. The at least one non-transitory computer readable medium of claim 19 wherein the program code for automatically creating an updated configuration specification for the at least one target configuration based on the updated policy-based profile describing the source configuration further comprises:
   program code for automatically creating an updated configuration specification describing a delta between an existing target configuration and an updated target configuration, and at least one operation to alter the at least one target configuration to eliminate the delta.

21. The at least one non-transitory computer readable medium of claim 19 further comprising:
   program code for determining that at least one modification has been made to the source configuration; and
   program code for, responsive to the at least one modification, creating the updated policy-based profile describing the source configuration.

22. The at least one non-transitory computer readable medium of claim 16 further comprising:
   program code for automatically ensuring that specific contents of a configuration profile is kept within boundaries specified by a set of applicable and valid policies.

23. The at least one non-transitory computer readable medium of claim 16 wherein program code for creating a policy-based profile describing the source configuration further comprises program code for specifying at least one policy type from a group of policy types consisting of:
   deferred policies;
   conditional policies;
   composite policies;
   requirement based policies; and
   allocated resource policies.

24. At least one non-transitory computer readable medium having instructions embodied therein that, when executed, cause a computer system to perform a method for automatically assembling at least one target configuration of a target host at a virtualization software level based on a source configuration of a first host at the virtualization software level, the method comprising:
   accessing the source configuration for the first host at the virtualization software level, wherein the first host is configured to instantiate at least one virtual machine;
   processing a policy-based profile describing the source configuration, the source configuration comprising a plurality of individual configuration settings representing a complete configuration of the source configuration of the first host at the virtualization software level from which to configure the at least one target configuration at deployment;
   automatically creating a configuration specification for the at least one target configuration based on the policy-based profile describing the source configuration by mapping each of the individual configuration settings of the plurality of individual configuration settings to the configuration specification for the at least one target configuration of the target host at the virtualization software level;
   automatically applying the configuration specification to the at least one target configuration, such that the at least one target configuration is based on the policy-based profile and such that the at least one target configuration represents the complete configuration of the source configuration;
   verifying that the at least one target configuration based on the configuration specification is in compliance with the policy-based profile describing the source configuration; and
   responsive to updating the policy-based profile, automatically updating the at least one target configuration to place the at least one target configuration in compliance with the updated policy-based profile.

* * * * *